United States Patent [19]

Bory

[11] Patent Number: 4,783,885

[45] Date of Patent: Nov. 15, 1988

[54] FAUCET HANDLE WITH DEFLECTABLE ATTACHMENT MEMBER

[75] Inventor: Steven Bory, River Forest, Ill.

[73] Assignee: Injecto Mold, Inc., Chicago, Ill.

[21] Appl. No.: 76,316

[22] Filed: Jul. 22, 1987

Related U.S. Application Data

[63] Continuation-in-part of Ser. No. 29,624, Mar. 24, 1987.

[51] Int. Cl.⁴ .............................................. B65D 25/28
[52] U.S. Cl. .................................... 16/114 R; 16/121;
16/DIG. 24; 251/108; 403/330
[58] Field of Search ............ 16/114 R, 121, DIG. 24,
16/DIG. 30, DIG. 40, DIG. 41; 251/107, 108;
403/329, 330, 361

[56] References Cited

U.S. PATENT DOCUMENTS

| | | | |
|---|---|---|---|
| 1,085,543 | 1/1914 | Collins | 403/329 |
| 3,177,024 | 4/1965 | Krook et al. | 403/329 |
| 3,543,329 | 1/1970 | Gulette et al. | 16/121 |
| 4,593,430 | 6/1986 | Spangler et al. | 16/114 R |

*Primary Examiner*—Nicholas P. Godici
*Assistant Examiner*—Edward A. Brown
*Attorney, Agent, or Firm*—George H. Gerstman

[57] ABSTRACT

A faucet handle comprises an upper portion having a top and downwardly depending skirt. A lower portion has an outer peripheral wall, an inward member, and a central sleeve for connection to handle hardware. The upper portion defines an aperture in the skirt, with the lower portion defining an outwardly biased, inwardly deflectable retention member having a part which snugly fits within the aperture. This causes the upper and lower portions to be retained in lock-together relation. The retention member is inwardly deflectable by pushing for a distance that permits unlocking and separation of the upper and lower portions.

8 Claims, 1 Drawing Sheet

FAUCET HANDLE WITH DEFLECTABLE ATTACHMENT MEMBER

CROSS REFERENCE TO RELATED APPLICATION

This application is a continuation-in-part of the application of Steven Bory, Ser. No. 29,624, filed Mar. 24, 1987 and entitled Faucet Handle.

BACKGROUND OF THE INVENTION

Faucet handles used in public areas are occasionally stolen, particularly if they are decorative and attractive. Often a top disc may be removed, and the handle can be disconnected from the handle hardware by using a screw driver. Often, the bolt for connecting the handle to the handle hardware is directly accessible from the top of the handle, which permits removal by the screwdriver.

While it is desirable for faucet handles in public installations to be decorative and attractive, there is a need to make them difficult for the public to remove. The faucet handle should not have any obvious means for removal, so that a would be thief is deterred from such action. Nevertheless, the handle of this invention, while having no means for removal presented in plain sight, is easily removed when the occasion demands.

It is, therefore, an object of the present invention to provide a faucet handle that is attractive in appearance, and which does not enable access to that handle hardware from the top of the faucet handle.

Another object of the present invention is to provide an attractive faucet handle that is simple in construction and relatively easy to manufacture.

A still further object of the present invention is to provide a faucet handle having a light transmissive upper portion, while at the same time it does not enable the user to view the handle hardware.

Other objects and advantages of the present invention will become apparent as the description proceeds.

SUMMARY OF THE INVENTION

In this invention, a faucet handle is provided which comprises an upper portion having a top and a downwardly depending skirt. A lower portion is also present, having an outer peripheral wall, an inward member, and a central sleeve for connection to handle hardware. By this invention, the upper portion defines an aperture in the skirt, while the lower portion defines an outwardly biased, inwardly deflectable retention member having a part which snugly fits within the aperture to retain the upper portion and lower portion in locked-together relation. However, the retention member is inwardly deflectable by pushing for a distance, for example by pushing through the aperture with a screwdriver. This permits unlocking and separation of the upper and lower portions when that is desired.

It is preferred for the skirt of the upper portion to define an annular flange positioned closely above the aperture. The skirt may thus provide a multiple function, one of which functions is to at least partly conceal the aperture from view from directions facing the upper portion.

Thus the aperture is relatively unnoticable, since it is difficult to view from the direction that a typical user of the faucet handle will occupy. Also, the aperture is filled with the snugly fitting part of the deflectable retention member, which may be made of the same color plastic or the like, so that only a small hair line crack, the view of which is blocked by the skirt, betrays the way by which the handle may be removed.

The inwardly deflectable retention member may comprise a resilient strip portion of the outer peripheral wall. This resilient strip portion, which may be integrally formed with the rest of the lower portion out of a suitable plastic such as polycarbonate, may be connected to the rest of the lower portion at only one end to form a springy, outwardly biased, inwardly deflectable retention member for engaging the aperture of the upper portion as described above.

The upper portion preferably defines at least an outer portion that is light transmissive, typically with an opaque, decorative insert interposed between the upper portion and the lower portion.

By this construction, there is a significant opportunity for a new look and style of faucet handle with a transparent outer portion and a decorative inner portion, so that the handle exhibits not only the utility of a different removal technique to deter thievery, but also a different style from that which has been previously available.

DESCRIPTION OF SPECIFIC EMBODIMENT

Figure 1:
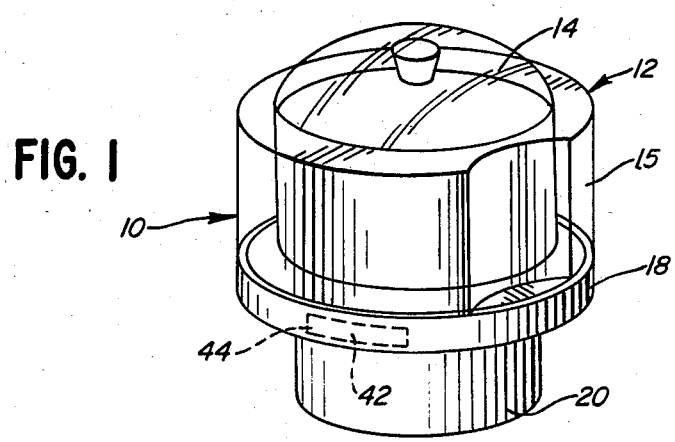
FIG. 1 is a perspective view of a faucet handle made in accordance with this invention.

Referring to the drawings, a faucet handle 10 is shown comprising an upper portion 12 which may include a top 14 and an attached, cylindrical side wall 15. Cylindrical side wall 16 may, in turn, be attached by spin welding or the like to annular flange 18 of downwardly depending skirt portion 20, so that the entire upper portion comprises the joined members 12 and 20. Skirt portion 20 may also include a closed top 22 if desired.

Faucet handle 10 also includes lower portion 24. Lower portion 24 may be attached by a bolt 26 to a conventional faucet valve 28.

The top 14 and side wall 15 of upper portion 12 may be formed as a unitary, one-piece molding of a transparent plastic material, for example, polycarbonate or acrylic plastic. Top 14 defines a convex top surface 30 and an inwardly projecting member 32. The transparency of top 14 permits the display of insert member 34 positioned within a space between upper portion 12 and lower portion 24. Insert member 34 may be opaque, to provide a decorative display within the transparent top portion 12. For example, insert 34 may be formed of an aluminum stamping having a decorative anodized display coating thereon. Alternatively, insert 34 may be made of a plastic material and coated with a metal such as aluminum, silver, or gold, with the metalized coating being applied by vacuum deposition. Alternatively, insert 34 may carry a printed or painted decoration, if desired, which may be visible through the typically transparent top portion 12.

Insert member 34 may be placed about skirt portion 20 prior to spin welding top portion 12 into sealed relation with annular flange 18, so that the insert 34 is hermetically sealed between top portion 12 and skirt 20.

Lower portion 24 defines outer peripheral wall 38, inward member 39, and central sleeve 41 for connection to the handle hardware.

When lower portion 24 has been attached to faucet valve 28, top portion 12 is then installed on the lower portion in the manner shown. As annular skirt 20 passes around lower portion 22 in telescoping relation therewith, an outwardly biased, inwardly deflectable retention member 36 is pushed inwardly, as shown particularly in dotted lines in FIG. 2. Inwardly deflectable retention member 36 is shown to comprise a resilient strip portion of the outer peripheral wall 38, with resilient strip 36 being connected to the rest of lower portion 24 at only one end, as shown by reference numeral 40 in FIG. 3. Additionally, retention member 36 defines an outwardly projecting lug 42. Accordingly, as depending skirt 20 advances along outer wall 38 of lower portion 24, aperture 44 defined in downwardly depending skirt 20 is presented to lug 42. Lug 42 is proportioned to snugly fit within aperture 44, so that when lug 42 and aperture 44 are in registry, retention member 36 can snap outwardly so that lug 42 occupies the aperture. It is preferred for the fit of lug 42 in aperture 44 to be as snug as possible, consistent with necessary tolerance to prevent lug 42 from being too large to fit in aperture 44, so that the peripheral crack between them is unobtrusive as possible.

Accordingly, when upper portion 12 is locked up on lower portion 24 by the engagement of retention member 36 in aperture 44, the means by which the upper portion 12 is carried on the faucet valve is not readily apparent, with aperture 44 being at least partially blocked from the normal view of a faucet user by flange 18. Thus, occasional users of the faucet in a public washroom are deterred from stealing upper handle portion 12.

Figure 2:
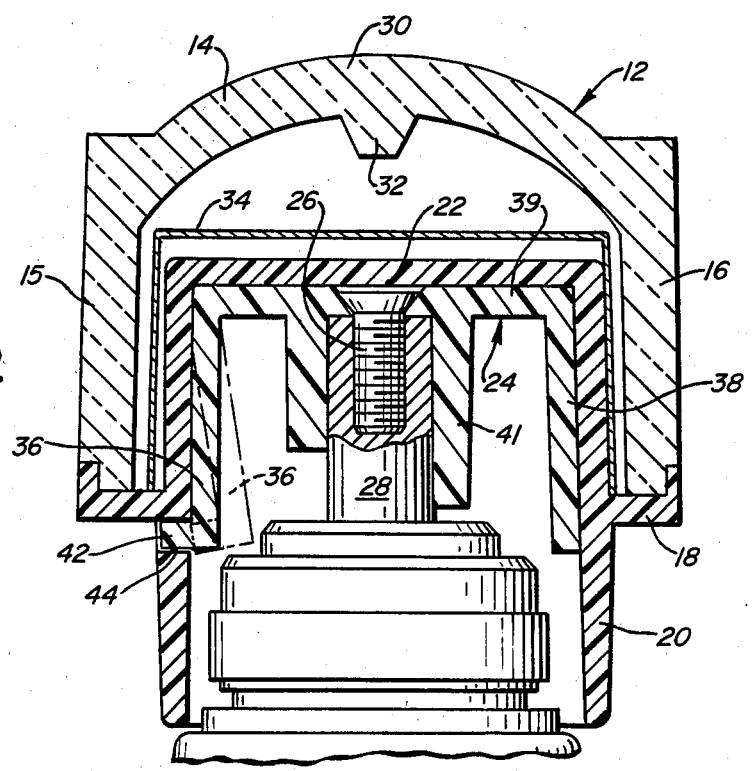
FIG. 2 is a longitudinal cross-sectional view of the faucet handle of FIG. 1, shown mounted upon a faucet assembly.
Figure 3:
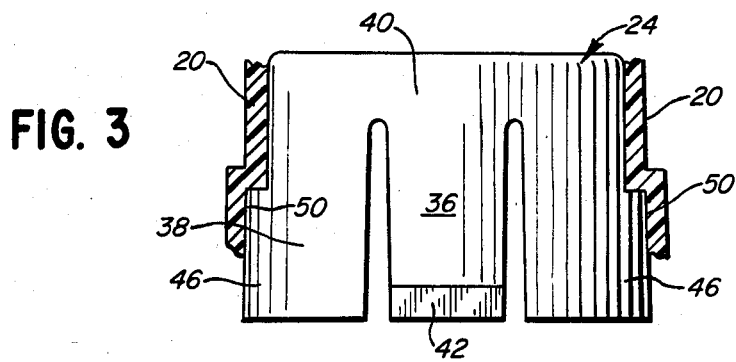
FIG. 3 is an elevational view of the lower portion and its outer peripheral wall, described above.

FIG. 3 is an elevational view of lower portion 24, rotated 90° from the view of FIG. 2, to show projections 46 which are formed in outer wall 38. These projections 46 fit into corresponding recesses 50 of downwardly depending skirt 20, to prevent rotational slippage between upper portion 12 and lower portion 24, and to rotationally orient lug 42 with aperture 44 as members 12 and 24 are assembled.

If it becomes necessary to remove upper handle portion 12 from the faucet, it is an easy matter to do so, making use of a screwdriver or the like to once again press retention member 36 inwardly, to unlock upper portion 12 and slide it off of its telescoping relation with lower portion 24.

Apart from the distinctions as recited above, the handle of this invention may be of a design and a purpose which is the same as that described in the previously cited patent application Ser. No. 29,624.

The above has been offered for illustrative purposes only, and is not intended to limit the scope of the invention, which is as defined in the claims below.

That which is claimed is:

1. A faucet handle which comprises:
   an upper portion having a top and a downwardly depending skirt, and
   a lower portion having an outer peripheral wall, an inward member, and a central sleeve for connection to handle hardware;
   said upper portion defining an aperture in said skirt, said lower portion defining an outwardly biased, inwardly deflectable retention member having a part which fits within said aperture to retain said upper portion and lower portion in locked-together relation, said retention member being inwardly deflectable by pushing for a distance that permits unlocking and separation of said upper and lower portions;
   said skirt having an annular flange positioned above said aperture, said flange serving to at least partly conceal said aperture from view from directions facing said upper portion.

2. A faucet handle which comprises:
   an upper portion having a top and a downwardly depending skirt; and
   a lower portion having an outer peripheral wall, an inward member, and a central sleeve for connection to handle hardware;
   said upper portion defining an aperture in said skirt, said lower portion defining an outwardly biased, inwardly deflectable retention member having a part which snugly fits within said aperture to retain said upper portion and lower portion in locked-together relation, said retention member being inwardly deflectable by pushing for a distance that permits unlocking and separation of said upper and lower portions, said retention member comprising a resilient strip portion of said outer peripheral wall connected to the rest of said lower portion at only one end, said downwardly depending skirt defining an annular flange positioned above said aperture, said flange serving to at least partly seal said aperture from view from directions facing said upper portion.

3. The handle of claim 1 in which said upper portion defines at least an outer portion that is light transmissive.

4. The handle of claim 1 in which an opaque insert is interposed between the top portion and the depending skirt.

5. A faucet handle which comprises:
   an upper portion having a top and a downwardly depending skirt;
   a lower portion for connection to a faucet valve via a threaded bolt having a head and a shank, said lower portion having an outer peripheral wall, an inward member defining a central opening for receiving the threaded bolt which connects the lower portion to the faucet valve, the central opening being dimensioned so that the shank of the bolt will pass through the opening while the head of the bolt will not pass through, thereby enabling the lower portion to be firmly attached via the threaded bolt to the faucet valve, and a downwardly depending central sleeve for coaxial positioning around the faucet valve;
   said upper portion defining an aperture in said skirt, said lower portion defining an outwardly biased, inwardly deflectable retention member having a part which fits within said aperture to retain said upper portion and lower portion in locked-together relation, said retention member being inwardly deflectable by pushing for a distance that permits unlocking and separation of said upper and lower portions, whereby the threaded bolt is unaccessible unless said upper portion is separated from said lower portion.

6. The handle of claim 1 in which said inwardly deflectable retention member comprises a resilient strip portion of said outer peripheral wall connected to the rest of said lower portion at only one end.

7. The handle of claim 1 in which said upper portion defines at least a top portion that is light transmissive.

8. The handle of claim 1 in which an opaque insert is interposed between the top portion and the depending skirt.

* * * * *